May 29, 1956 F. G. MERRILL ET AL 2,748,283

FREQUENCY MULTIPLIER APPARATUS

Filed Aug. 19, 1953 2 Sheets-Sheet 1

INVENTORS F. G. MERRILL
L. C. THOMAS

BY W. J. O'Neill

ATTORNEY

FREQUENCY MULTIPLIER APPARATUS

Filed Aug. 19, 1953 2 Sheets-Sheet 2

INVENTORS F. G. MERRILL
L. C. THOMAS
BY W. J. O'Neill
ATTORNEY

United States Patent Office 2,748,283
Patented May 29, 1956

2,748,283

FREQUENCY MULTIPLIER APPARATUS

Francis G. Merrill, Chatham, and Lewis C. Thomas, North Plainfield, N. J., assignors to Bell Telephone Laboratories, Incorporated, New York, N. Y., a corporation of New York Application August 19, 1953, Serial No. 375,222

11 Claims. (Cl. 250—36)

This invention relates to wave generators, and particularly to pulse generators of the phase shift type which may be utilized as harmonic generators for frequency multiplication, and for other purposes.

One of the objects of this invention is to provide improved pulse generator systems.

Another object of this invention is to provide circuit simplicity and good control of pulse parameters in pulse generators.

Another object of this invention is to provide harmonic generator apparatus capable of meeting rather severe requirements.

Another object of this invention is to provide a pulse generator which will have a substantially linear input-output amplitude level relationship over a substantial range of input amplitude level.

Another object of this invention is to generate pulses which contain odd harmonic multiples of the input frequency, particularly in combination with the previous objectives.

Another object of this invention is to generate pulses in which a particular desired harmonic frequency is accentuated with respect to other unwanted harmonics.

In accordance with this invention, frequency multiplication may be obtained by generating suitable pulse waves, and then filtering the desired odd or even order harmonic frequency from the pulse waves, the pulse waves being generated by means of a phase shift type of pulse generator having such advantages as circuit simplicity and good control of the pulse parameters.

In accordance with this invention, the phase shift type of pulse generator may generally comprise a suitable source of applied input frequency waves or signals as a single phase sine wave source, means for splitting such input source waves or signals into a pair of sine waves, means for suitably phase shifting such pair of split waves sufficiently with respect to each other to provide desired wave forms, and means for selecting portions either positive or negative or both from such pair of phase shifted waves for providing desired pulses, which may be of substantially triangular pulse shape, in an output load circuit. The pulse repetition rate may be the same as the frequency of the applied input source sine waves from which the pulses are derived, and the pulse waves may be utilized for frequency multiplication purposes, or for other purposes.

The phase shift type of pulse and harmonic generator apparatus provided in accordance with this invention may be utilized in frequency multiplier apparatus capable of providing output frequency waves that are an exact multiple of the input source frequency and that when filtered may be relatively free from spurious or unwanted output product frequencies, and that may have a linear or nearly linear input to output voltage relation.

Accordingly, the frequency multiplier apparatus provided in accordance with this invention may be utilized where frequency multiplication requirements may be rather severe, as in the case of frequency multiplying in the feedback loop of a precision oscillator for example, or in numerous other frequency multiplier applications having similar or less severe requirements.

For a clearer understanding of the nature of this invention and the additional advantages, features and objects thereof, reference is made to the following description taken in connection with the accompanying drawings, in which like reference characters represent like or similar parts and in which.

Figure 1:
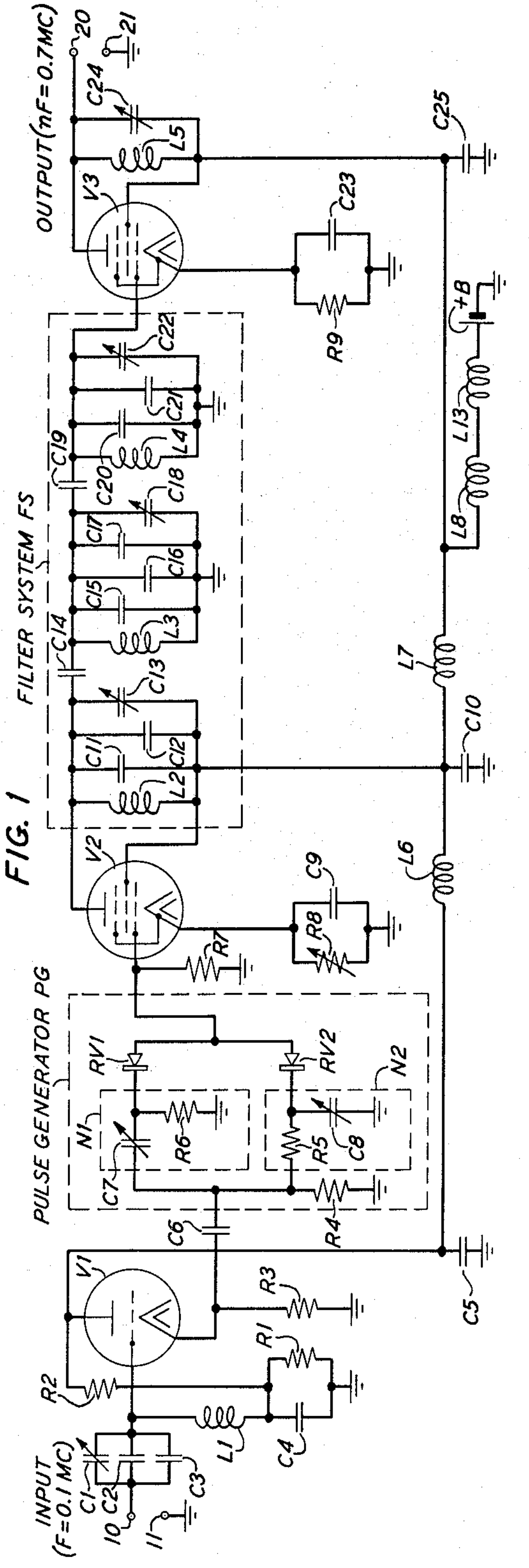
Fig. 1 is a circuit diagram illustrating frequency multiplier apparatus utilizing a phase shift type of pulse generator and harmonic producer.

Referring to the drawing, Fig. 1 is a schematic circuit diagram illustrating frequency multiplier apparatus comprising a pulse generator PG adapted for generating desired pulses from an input source of single phase sine waves or signals of frequency F as applied at input terminals 10, 11 thereof and adapted for generating desired harmonic output frequency waves or signals of frequency $n$F as obtained from the output terminals 20, 21 thereof, the frequency multiplication being obtained by pulse generation and filtering the desired harmonic $n$F from the pulses.

Figure 2:
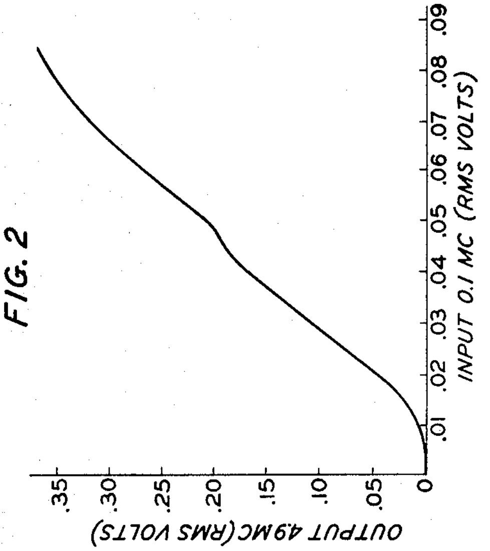
Fig. 2 is a graph illustrating an example of the input-output voltage characteristic that may be obtained from frequency multiplier apparatus of the type illustrated in Fig. 1.

As shown in Fig. 1, the over-all circuit may generally comprise a cathode follower V1, a phase shift pulse generator PG, an amplifier V2, a filter system FS, and a tuned amplifier V3. In this arrangement, the cathode follower V1 may be utilized to provide a low impedance drive for the pulse generator PG, and the pulse generator output to amplifier V2 may be filtered and amplified by the filter FS and the tuned amplifier V3 to obtain the desired harmonic frequency waves of frequency $n$F at output terminals 20, 21. If desired, the process may be similarly repeated for further frequency multiplication by applying the harmonic output of frequency $n$F from the output terminals 20, 21 to the input of another and similar pulse generator and filtering circuit (not shown) of the same type as shown in Fig. 1, thereby to obtain still higher harmonic frequency waves from the two or more of such circuits so connected in tandem. This method of frequency multiplication using a phase shift type of harmonic pulse generation may be utilized to obtain, among other advantages, a nearly linear input to output voltage relation characteristic as illustrated in Fig. 2 for example.

As particularly illustrated in Fig. 1, a source of single phase input frequency sine waves of frequency F may be applied to the input source terminals 10, 11 at a suitable level as of about 0.07 volt across 75 ohms, or of other suitable values. The impedance and voltage may be transformed to about 5 volts, or to other suitable value, by means of a resonant circuit which may comprise parallel-connected capacitors C1, C2, C3 connected between the input terminal 10 and the control grid electrode of the cathode follower tube V1 and coil L1 connected between the control grid electrode of tube V1 and capacitor C4. A suitable divider, which may comprise resistors R1 and R2, may be utilized to raise the control grid electrode of the cathode follower tube V1 to a suitable positive direct current voltage to permit undistorted reproduction of the relatively large control grid signal thereon. The cathode follower tube V1 may then serve as a low-impedance high-voltage sine wave signal source to drive the phase shifting networks N1 and N2 which, as illustrated in Fig. 1, may comprise respectively a series capacitor C7 and a shunt resistor R6 disposed in one parallel branch of the pulse generator PG, and a series resistor R5 and a shunt capacitor C8 disposed in the other parallel branch thereof.

Accordingly, the single phase sine wave signal of input frequency F, received by pulse generator PG from the cathode output of the cathode follower tube V1 through the coupling capacitor C6, may be first split into a pair of sine wave signals of frequency F by the pair of parallel-connected circuits of pulse generator PG wherein they are applied to the pair of phase shifting networks N1 and N2 disposed therein for providing a pair of phase shifted sine waves, one being shifted backward in phase with respect to the phase of the input sine waves by network N2 and the other being equally shifted by network N1 forward in phase with respect to the phase of the same input sine waves as received from the output of the cathode follower tube V1 through the coupling capacitor C6.

The pair of resulting phase shifted sine waves provided by the two respective phase shifting networks N1 and N2 may then be applied to respective germanium crystal rectifiers or varistors RV1 and RV2 having their common outputs connected to the common grid circuit of tube V2. The rectifiers RV1 and RV2 responsive to the respective phase shifted sine wave signals provided by the phase shift networks N1 and N2 and having their outputs connected together may provide a type of "either or" circuit which may be utilized for passing potential to the common output circuit at tube V2 from whichever of the two phase shifted waves supplied by the phase shifting networks N1 and N2 to the respective rectifiers RV1 and RV2 is at a more negative potential with respect to the other.

Figure 4:
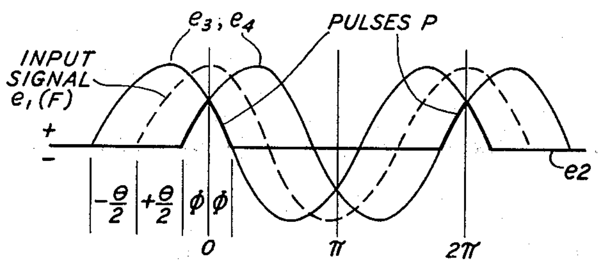
Fig. 4 is a graph illustrating an example of wave forms and phase relations involved in the phase shift type pulse generator shown in Figs. 1 and 3.

With a proper phase adjustment between the pair of phase shifted waves as provided by the pair of phase shifting networks N1 and N2, the resulting waves in the common output circuit at the grid circuit of tube V2 may approach a series of positive and nearly triangular shaped pulse signals P as shown in Fig. 4, each having an amplitude which may be proportional to that of the applied input sine wave signal *e1* received from the input signal source V1, and each derived from selected portions or segments of the pair of phase shifted waves *e3* and *e4* as shown in Fig. 4 and provided by the two respective phase shift networks N1 and N2 of Fig. 1.

The ratio of pulse width to pulse period for the substantially triangular shaped pulses P of Fig. 4 may be adjusted by adjustment of the component impedance elements of the phase shift networks N1 and N2 of Fig. 1 to values suitable to provide a desired or predetermined phase shift between the pair of waves *e3* and *e4* phase shifted by the respective phase shifting networks N1 and N2. The ratio of pulse width to pulse period for the pulse signal currents in the plate circuit of tube V2 may also be adjusted by a combination of such phase shift adjustment between the two phase shifted waves *e3* and *e4*, and of bias adjustment for the tube V2. By such adjustments, a desired output pulse of the shape of pulse P, which may contain a desired odd harmonic frequency signal, may be produced from the applied input source sine wave signal *e1* of frequency F.

As illustrated in Fig. 1, a desired output harmonic sine wave signal of frequency *n*F, such as a seventh harmonic output signal, for example, may be produced at the output terminals 20 and 21 by passing the pulse signals P received from the rectifiers RV1 and RV2 of the pulse generator PG to the amplifier tube V2 and through a suitable harmonic filtering system FS and a tuned output amplifier tube V3 having a tuned plate circuit which may comprise a parallel connected inductor L5 and capacitor C24 connected to the output terminals 20, 21 through ground capacitor C25.

As particularly shown in Fig. 1, the harmonic filtering system FS may comprise a series of suitable inductors L2 to L4 and capacitors C11 to C22 adapted to form a band pass filter FS which may be tuned to the seventh, or other desired harmonic *n*F, of the applied input frequency F, and which may be amplified by the tuned amplifier tube V3 to any desired voltage such as one comparable to the input voltage of the first tube V1. The amplifier tube V3 with its tuned plate circuit capacitor C24 and inductor L5 also may provide additional discrimination against spurious or unwanted harmonic products, and transmit the desired output harmonic signal of frequency *n*F to the output terminals 20, 21.

It will be understood that the harmonic frequency *n*F obtained at the output terminals 20, 21 may, if desired, be further frequency multiplied by repeating the process in a similar second pulse generator and harmonic producer stage having its input connected to the output terminals 20, 21 of Fig. 1. In such an arrangement, an initial fundamental single phase input frequency F of 0.1 megacycle per second for example may be frequently multiplied to a seventh harmonic frequency *n*F of 0.7 megacycle per second for example in the first stage by the circuit of Fig. 1; and the latter frequency may then be similarly frequency multiplied again in a second stage by a similar circuit to a seventh harmonic frequency thereof of 4.9 megacycles per second for example.

As an illustrative example in a particular case for a frequency multiplier as illustrated in Fig. 1 having an input single phase sine wave fundamental frequency F of 0.1 megacycle per second applied at input terminals 10 and 11 and producing an harmonic output frequency *n*F=7F or 0.7 megacycle per second as obtained at the output terminals 20 and 21, the components of the particular circuit shown in Fig. 1 may have particular values approximately as follows: The cathode follower vacuum tube V1 may comprise a type 5842 (WE417A) triode and the amplifier vacuum tubes V2 and V3 may each be type 6AK5 pentodes, provided with suitable cathode heaters and suitable plate and screen grid positive (+B) power supply voltages from source +B through suitable inductance coils L6, L7, L8, L13 connected with suitable ground capacitors C5, C10, C25. The rectifiers RV1 and RV2 may be any suitable rectifiers such as type IN43 (WE400A) crystal varistors. The resistors of Fig. 1, for this particular example, may have resistance values approximately as follows as expressed in ohms: R1=27,000; R2=100,000; R3=1200; R4=4700; R5=820; R6=750; R7=470,000; R8=330; R9=330. The capacitors of Fig. 1 may have, for the present example, capacitance values approximately as follows as expressed in micro-microfarads: C1=7 to 45; C2=180; C3=33; C4=10,000; C5=250,000; C6=1,000,000; C7=1200; C8=3000; C9=100,000; C10=250,000; C11=470; C12=75; C13=7 to 45; C14=5; C15=330; C16=680; C17=27; C18=7 to 45; C19=5; C20=470; C21=75; C22=7 to 45; C23=100,000; C24=7 to 45; C25=250,000. The inductors of Fig. 1 may have, for the present example inductance values approximately as follows as expressed in microhenries: L1=10,000; L2=100; L3=50; L4=100; L5=1000; L6=75,000; L7=2000; L8=2000; L13=50,000. While particular values have been given in the above illustrative example, it will be understood that other values for the component elements of the circuit of Fig. 1 may be utilized to suit other frequency and circuit conditions.

The frequency multiplier system illustrated in Fig. 1 depends upon harmonic generation which may mean that there may be present other and unwanted harmonic product frequencies, some of which may be close to the desired harmonic frequency, but which may be reduced by a suitable harmonic filtering system FS and V3 in the output of the pulse generator PG.

To simplify the filtering problem, particularly where the total desired multiplying factor may be relatively large such as for example a total multiplying factor of 49, the latter factor may be divided into two multiplying factors of 7 each. For example, where the input frequency F applied at input terminals 10, 11 of Fig. 1 is 0.1 megacycle per second as in the example given, this frequency may be multiplied 7 times to a frequency of $nF=7F=0.7$ megacycle per second at the output terminals 20, 21 of Fig. 1; and the latter frequency may then be again multiplied 7 times in another similar multiplier (not shown) to the still higher frequency of $nF=49F=4.9$ megacycles per second. Fig. 2 is based on such a multiplication factor.

Such a division of the assumed multiplying factor of 49 into two factors of 7 each permits filtering of harmonics of the input frequency F of 0.1 megacycle per second at the intermediate frequency of 0.7 megacycle per second and any spurious frequencies appearing in the final output of 4.9 megacycles per second will be harmonic of the intermediate frequency of 0.7 megacycle per second rather than of the input frequency F of 0.1 megacycle persecond. Thus greater relative separation may be obtained between the adjacent harmonics of such intermediate and final output frequencies with resulting better and simpler filtering of harmonics. A frequency multiplier system utilizing two such stages of multipliers in tandem to obtain a total multiplying factor of 49 is disclosed as a component of an oscillator which is described and claimed in a copending application for Crystal Oscillator Apparatus Serial No. 375,245, filed August 19, 1953, by E. P. Felch (Case 11).

Fig. 2 is a graph illustrating an example of the nearly linear input to output voltage relation characteristic that may be obtained from a multiplier system utilizing two stages of multipliers each of the phase shift harmonic generator type circuit illustrated in Fig. 1. As shown in Fig. 2, the input voltage applied at a frequency of $F=0.1$ megacycle per second to the input terminals 10, 11 of Fig. 1 varies from 0 to about 0.08 volt (R. M. S.) while the corresponding output voltage obtained from the output of the frequency multiplier varies from 0 to about 0.35 volt (R. M. S.) at the final output frequency of $nF=49F=4.9$ megacycles per second as obtained from two successive frequency multiplier stages each of the type shown in Fig. 1, and each contributing a multiplying factor of $n=7$, or $7\times7=49$ for both, from the initial input frequency $F=0.1$ megacycle per second to a final output frequency of 4.9 megacycles per second.

Figure 3:
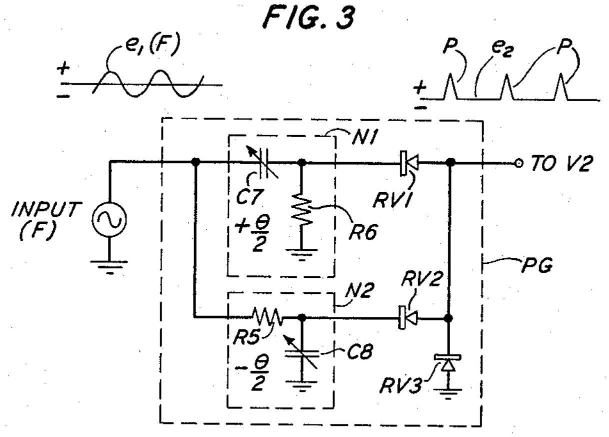
Fig. 3 is a circuit diagram illustrating a phase shift pulse generator of the general type illustrated in Fig. 1.

Fig. 3 is a circuit diagram illustrating a phase shift pulse generator PG of the type illustrated at PG in Fig. 1, and which may be utilized as an alternative arrangement, using an additional rectifier RV3, to provide from an input source of sine waves e1 of frequency F, an output pulse type wave e2 containing desired pulses P which as shown in Figs. 3 and 4 may be positive (+) pulses P of substantially triangular shape having a pulse repetition rate equal to the frequency F of the input source sine wave e1.

Fig. 4 is a graph illustrating typical wave forms and phase relations that may be involved in the phase shift type of pulse generator illustrated in Figs. 1 and 3. As shown in Fig. 4, curve e1 may represent the input source sine wave or signal e1 of frequency F as received from the input amplifier V1 of Fig. 1; curves e3 and e4 of Fig. 4 may represent the pair of phase shifted equal amplitude sine waves or signals as produced from the input sine waves e1 and equally phase shifted forward and backward a selected value of $\theta$ degrees by means of the phase shift networks N1 and N2 of Figs. 1 and 3; and curve e2 of Figs. 3 and 4 may represent the pulse type output wave e2 having positive (+) pulses P of substantially triangular pulse shape and of selected pulse width $2\Phi$, as derived or selected from the positive (+) portions of the pair of phase shifted sine waves e3 and e4 by the pulse generator PG of Figs. 1 and 3.

As illustrated in Figs. 1, 3 and 4, the input sine wave signal e1 of frequency F may be applied from the amplifier V1 to the input of the pulse generator PG of Figs. 1 and 3 where it may be split by the two parallel branches thereof into a pair of sine waves e3 and e4 shifted in phase by means of the respective networks N1 and N2 therein, the respective resistance-capacitance networks N1 and N2 being adapted to shift forward and backward the relative phase of the pair of respective sine wave signals e3 and e4 by plus (+) $\theta/2$ and minus (−) $\theta/2$ degrees with respect to the input sine wave signal e1 as illustrated in Fig. 4.

The rectifiers RV1 and RV2 of Figs. 1 and 3 may be utilized to prevent the output pulse signal e2 from becoming greater than the smaller instantaneous value of the two sine wave signals e3 and e4. The additional rectifier RV3 of Fig. 4 may be utilized to prevent the output pulse signal e2 from becoming negative (−) at any time, with the result that the output signal e2 may become a series of triangular shaped positive pulses P, as illustrated in Figs. 3 and 4, selected and derived from the positive (+) portions of the pair of sine wave signals e3 and e4.

While in Figs. 3 and 4 positive type pulses P only are particularly shown, it will be understood that either positive or negative portions of the pair of phase shifted sine wave signals e3 and e4 may be selected therefrom and utilized if desired.

The pulse signals P of triangular shape as shown in Figs. 3 and 4 may be shaped and adapted to contain a desired harmonic which may be selected and utilized in the harmonic generator circuit of Fig. 1. A study of the harmonic analysis of such triangular pulses P may be made to determine the best pulse width $\Phi+\Phi$ ($2\Phi$) for obtaining the greatest value of the desired harmonic, such as for obtaining the maximum or greatest value of the seventh harmonic for example.

An analysis based on pulses P formed by segments of the pair of sine waves e3 and e4 of Fig. 4 may be made. The phase shifts may be represented by plus and minus $\Phi$ degrees for simple equations, as shown for the pulse P of Fig. 4. The voltage e4 for the leading edge of the pulse P is:

$$e4\Big]_{-\phi}^{0}=E\sin(pt+\phi)\Big]_{-\phi}^{0} \qquad (1)$$

and for the trailing edge of the pulse P, the voltage e3 is:

$$e3\Big]_{0}^{\phi}=-E\sin(pt-\phi)\Big]_{0}^{\phi} \qquad (2)$$

These voltages for the leading and trailing edges of the pulse P, entered in the equations for Fourier analysis, determine the harmonic content of the pulse P; and the harmonic coefficients A and B for the $n$th harmonic are given in this case by:

$$A_n=\frac{1}{\pi}\left[\int_{-\phi}^{0}e4\cos npt\,dpt+\int_{0}^{\phi}e3\cos npt\,dpt\right] \qquad (3)$$

$$B_n=\frac{1}{\pi}\left[\int_{-\phi}^{0}e1\sin ndt\,dpt+\int_{0}^{\phi}e3\sin npt\,dpt\right] \qquad (4)$$

Performing the operations indicated results in:

$$A_n=2e\frac{\cos n\phi-\cos\phi}{\pi(1-n^2)} \qquad (5)$$

$$B_n=0 \qquad (6)$$

Figure 5:
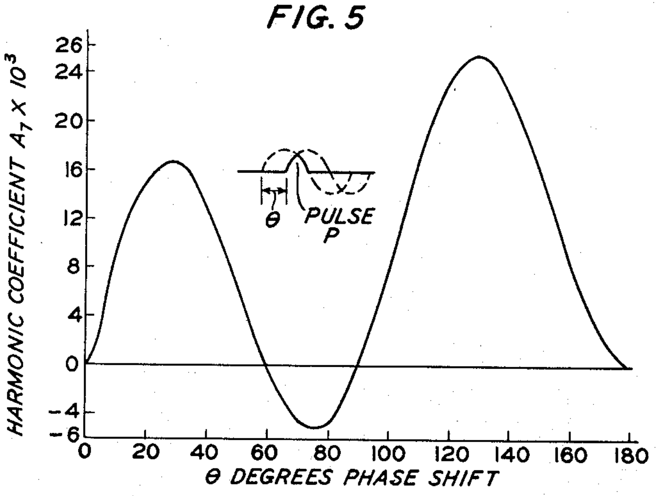
Fig. 5 is a graph illustrating the values for the seventh harmonic coefficient A7 of a pulse P derived from segments of a pair of sine waves phase shifted $\theta$ degrees apart.

Plotting $A_n$ for the seventh harmonic (A7) versus the sum of the phase shifts $\theta$ produces the curve shown in Fig. 5. The phase shift $\theta$ is equal to 180 degrees minus twice $\phi$ as indicated. Accordingly, the phase shift $\theta$ may be about 130 degrees for maximum seventh harmonic output (A7) as shown by the curve of Fig. 5, though operation with the phase shift $\theta$ of about 30 degrees as shown in Fig. 5, may also be utilized for somewhat less than maximum seventh harmonic output from the circuit of Fig. 1. The phase shift $\theta$, as used in particular example of values given hereinbefore for the circuit of Fig. 1 approaches the $\theta=130$ degrees phase shift for obtaining the seventh harmonic output frequency of $nF=0.7$ megacycle per second at the output terminals 20, 21 of Fig. 1.

While the negative (−) part of the output pulse wave $e2$ may be cut off at zero voltage by the use of a rectifier RV3 as shown in Fig. 3, this voltage limiting action is approximated in the circuit of Fig. 1 by the control grid bias in the cathode circuit of the amplifier tube V2, suitable negative bias voltage being developed therein which may be made about equal to three volts. The positive triangular pulse therefore drives the tube V2 into its operating region, while the negative portion of the wave from the pulse generator drives the tube V2 into the cut-off region and hence does not appear in the plate current output of tube V2.

Although this invention has been described and illustrated in relation to specific arrangements, it is to be understood that it is capable of application in other organizations and is therefore not to be limited to the particular embodiments disclosed.

What is claimed is:

1. Pulse generator apparatus comprising a source of single phase input frequency sine waves, means including a pair of parallel-connected branch circuits connected to said source for providing a pair of sine waves from said single phase input source waves, means comprising a phase shift network disposed in each of said respective branch circuits for selectively spacing the relative forward and backward phase shift between said pair of waves sufficiently to provide desired wave shapes suitable for selecting therefrom substantially triangular shaped pulses, means comprising rectifiers connected with said respective networks and disposed in said respective branch circuits for selecting said substantially triangular shaped pulses from said pair of phase shifted waves, and means connected with said rectifiers for taking off said pulses therefrom in a common output load circuit, one of said phase shift networks being disposed in one of said pair of parallel-connected circuits and comprising series and shunt impedance means for shifting said waves therein forward in phase with respect to the phase of said input source waves, and another of said phase shift networks being disposed in the other of said pair of parallel-connected circuits and comprising series and shunt impedance means for shifting said waves therein backward in phase with respect to said phase of said input source waves.

2. Pulse generator apparatus in accordance with claim 1, and voltage limiter means connected to said common output of said pair of parallel-connected circuits for cutting off at substantially zero voltage the parts of said pair of phase shifted waves having a voltage of one only of the voltage polarities positive and negative for thereby limiting said pulses to having a voltage only of one of said positive and negative polarities.

3. Pulse generator apparatus in accordance with claim 2, said voltage limiter means comprising means for cutting off at substantially zero voltage the negative voltage parts of said pair of phase shifted waves for thereby limiting said pulses to positive voltage pulses only.

4. Pulse generator apparatus in accordance with claim 3, said voltage limiter means comprising an electron tube having means for applying sufficient negative bias potential to the control grid electrode thereof for said cutting off at said substantially zero voltage said negative voltage parts of said pair of phase shifted waves.

5. Harmonic generator apparatus comprising a source of single phase input sine waves, pulse generator means of the phase shift type connected to said input source for generating substantially triangular shaped pulses containing therein waves of a desired harmonic frequency, and means connected to said pulse generator means for filtering out said desired harmonic frequency waves from said pulses, said pulse generator means comprising means including a pair of parallel-connected branch circuits for splitting said single phase input source waves into a pair of sine waves, means including a pair of phase shift networks respectively disposed in said pair of parallel-connected branch circuits for selectively phase shifting said pair of waves therein, and means including a pair of rectifiers respectively disposed in said pair of parallel-connected branch circuits for selecting said substantially triangular shaped pulses from said pair of phase shifted waves, one of said phase shift networks being disposed in one of said pair of parallel-connected branch circuits and comprising impedance means for shifting said waves therein forward in phase with respect to the phase of said source waves, and another of said phase shift networks being disposed in the other of said pair of parallel-connected branch circuits and comprising impedance means for shifting said waves therein backward in phase with respect to said phase of said source waves, said forward and backward phase shifts of said pair of phase shifted waves being values adapted to provide for said pulses derived therefrom a pulse shape value corresponding to said desired harmonic frequency therein.

6. Harmonic generator apparatus for frequency multiplying input sine waves of frequency F to desired harmonic output sine waves of frequency $nF$ comprising a source of single phase input frequency sine waves of said frequency F, pulse generator means of the phase shift type connected to said source for generating desired uni-polarity voltage pulses of substantially triangular shape containing therein waves of said desired harmonic frequency of said frequency $nF$, said pulse generator means comprising a pair of parallel-connected branch circuits including therein phase shift networks and crystal rectifiers having a common output circuit for generating said desired pulses from said pair of phase shifted sine waves provided by said phase shift networks, said pulses having a pulse width value related to the phase shift value between said pair of phase shifted sine waves and corresponding to a pulse shape value containing therein said desired harmonic frequency of said frequency $nF$, voltage polarity control means connected to said common output circuit of said parallel-connected branch circuits for cutting off at substantially zero voltage all voltage portions of said pair of phase shifted waves except said desired uni-polarity voltage pulses to be transmitted, harmonic filter means connected to said last-mentioned means and comprising a plurality of sections of parallel-connected inductance and capacitance devices for filtering out said desired harmonic frequency waves of said frequency $nF$ from said pulses, and tuned amplifier means connected to said harmonic filter means for amplifying the voltage of said desired harmonic frequency waves of said frequency $nF$ to a desired value.

7. Harmonic generator apparatus in accordance with claim 6, one of said phase shift networks being disposed in one of said branch circuits of said pair of parallel-connected branch circuits and comprising a series capacitor and a shunt resistor, and another of said phase shift networks being disposed in the other of branch circuits of said pair of parallel-connected branch circuits and comprising a series resistor and a shunt capacitor.

8. Frequency multiplier apparatus for frequency multiplying input sine waves of frequency F to desired substantially exact harmonic output sine waves of frequency $nF$ where $n$ is an odd order integer not less than three and for providing a substantially linear input to output voltage characteristic relation for said input and output sine waves of frequencies F and $nF$ comprising a source of single phase input frequency sine waves of said frequency F, electronic amplifier means connected to said source, pulse generator means of the phase shift type connected to said amplifier means and adapted for generating positive voltage pulses of substantially triangular shape containing therein said odd harmonic frequency waves of said frequency $n$F, said pulses having a pulse repetition rate corresponding to said frequency of said input source sine waves of said frequency F and having a pulse amplitude substantially proportional to the amplitude of said single phase input source sine waves of said frequency F and having a pulse shape and pulse width made of values corresponding to values containing therein said desired odd harmonic frequency waves of said frequency $n$F, said pulse generator means comprising a pair of parallel-connected branch circuits including therein phase shift networks and rectifiers having a common output circuit and adapted for splitting said sine waves of said frequency F derived from said input source into a pair of phase shifted sine waves of said frequency F having substantially equal amplitudes and for generating pulse type waves containing therein said desired positive voltage pulses derived from positive portions of said pair of phase shifted sine waves in said respective branch circuits, electronic amplifier means having a control grid electrode connected to said common output circuit of said parallel connected branch circuits of said pulse generator means, means for applying sufficient negative bias potential on said control grid electrode for cutting off at substantially zero voltage the negative voltage portions of said pair of phase shifted waves and permitting said desired positive pulses only to be transmitted, means connected to the anode output of said last-mentioned amplifier means and comprising a plurality of sections of parallel-connected inductance and capacitive devices tuned to said desired odd harmonic frequency $n$F to form a band pass type filter for filtering and selecting said desired odd harmonic frequency waves of said frequency $n$F from said positive voltage pulses, and electronic amplifier means connected to said filter means for amplifying the output sine wave voltage thereof of said frequency $n$F to a value comparable to the voltage value of said input source sine waves of said frequency F, said last-mentioned amplifier means having resonant output circuit means comprising parallel-connected inductance and capacitance devices tuned substantially to said desired harmonic frequency waves of said frequency $n$F for selecting and transmitting said desired harmonic frequency waves and for providing additional discrimination against spurious unwanted harmonic products therein having frequencies different from said desired harmonic frequency waves of said frequency $n$F.

9. Frequency multiplier apparatus in accordance with claim 8, one of said phase shift networks being disposed in one of said pair of said parallel-connected branch circuits of said pulse generator means and comprising means including a series capacitor and a shunt resistor for shifting said sine waves therein forward in phase with respect to the phase of said input source sine waves, and the other of said phase shift networks being disposed in the other of said pair of said parallel-connected branch circuits of said pulse generator means and comprising means including a series resistor and a shunt capacitor for substantially equally shifting said sine waves therein backward in phase with respect to said phase of said input source sine waves.

10. Frequency multiplier apparatus in accordance with claim 9, said rectifiers disposed in each of said pair of said parallel-connected branch circuits of said pulse generator means comprising germanium crystal type rectifier means for passing current from whichever of said pair of phase shifted sine waves supplied thereto by said respective phase shift networks is at a more negative potential with respect to the other.

11. Frequency multiplier apparatus in accordance with claim 10, said pulse width and shape of said desired positive voltage pulses having a value corresponding to a substantially maximum value for said desired odd harmonic frequency wave of said frequency $n$F contained in said pulses.

References Cited in the file of this patent

UNITED STATES PATENTS

| | | |
|---|---|---|
| 2,207,048 | Campbell | July 9, 1940 |
| 2,226,459 | Bingley | Dec. 24, 1940 |
| 2,484,612 | Dehn et al. | Oct. 11, 1949 |
| 2,541,378 | Nyquist | Feb. 13, 1951 |